Feb. 20, 1923.

F. H. ROOT.
DIFFERENTIAL MECHANISM.
FILED FEB. 4, 1921.

1,446,069.

Francis H. Root
INVENTOR.

BY

Parsons + Bodell
ATTORNEYS.

Patented Feb. 20, 1923.

1,446,069

UNITED STATES PATENT OFFICE.

FRANCIS H. ROOT, OF WATERTOWN, NEW YORK.

DIFFERENTIAL MECHANISM.

Application filed February 4, 1921. Serial No. 442,410.

*To all whom it may concern:*

Be it known that I, FRANCIS H. ROOT, a citizen of the United States, and a resident of Watertown, in the county of Jefferson and State of New York, have invented a certain new and useful Differential Mechanism, of which the following is a specification.

This invention has for its object a differential mechanism or gearing which is particularly simple in construction, economical in manufacture and highly efficient and durable in use.

The invention consists in the novel features and in the combinations and constructions hereinafter set forth and claimed.

In describing this invention, reference is had to the accompanying drawings, in which like characters designate corresponding parts in all the views.

Figure 1:
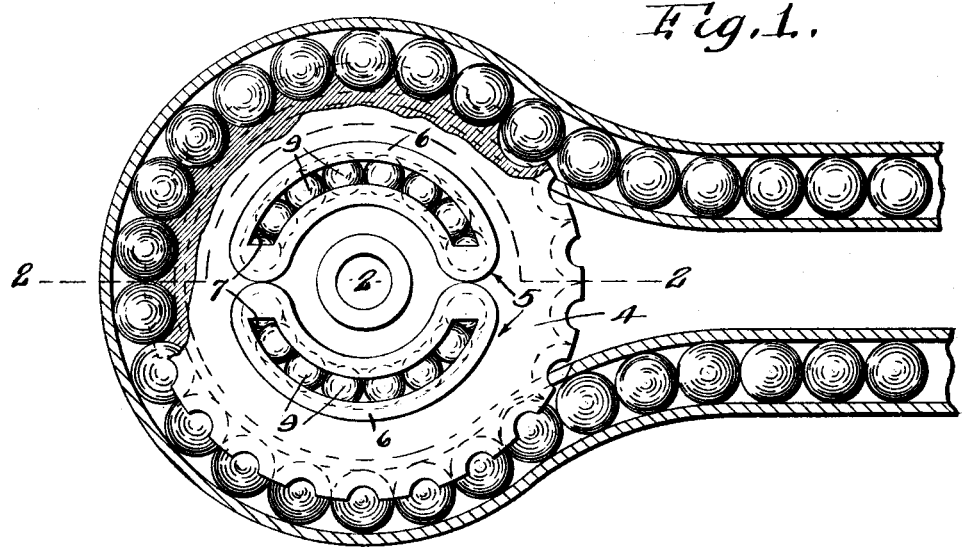
Figure 2:
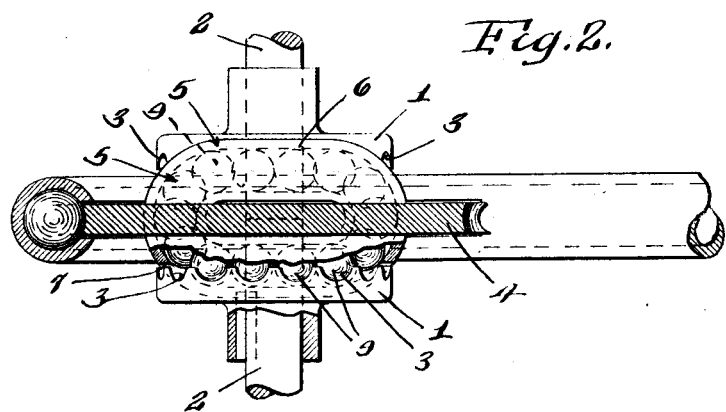

Figure 1 is a side elevation, partly in section, of my differential gear and contiguous parts; and Figure 2 is a sectional view, taken on line 2—2, Figure 1.

This differential gearing comprises generally, opposing main wheels or gears, a driving element, and an endless raceway carried by the driving element and including side portions having slots for receiving the working faces of said wheels or gears and end portions extending transversely of the driving wheel and connecting side portions and parts movable through the raceway and coacting with the opposing wheels or gears to transmit the differential motion of either to the other.

1 designates the main, or side gears, which are mountable upon shaft sections 2 in any well-known manner.

These side wheels are here shown as formed with sockets 3.

4 designates the driving element, which may be carried by a casing or formed as a part of the casing in the ordinary manner.

5 is a raceway carried by the driving element over which the compensating mechanism passes, the raceway having side portions 6 arranged in juxtaposition to the socketed portions of the wheels 1 and being here shown as formed with slots 7 for receiving the socketed portions or peripheries of the wheels 1, and end portions extending transversely of the driving element and connecting the side portions so that the raceway is endless.

9 are balls movable through the raceway and adapted to be received in the sockets of the wheels, so that when there is any differential movement between the two shaft sections, such differential movement is transmitted from one wheel 1 to the other by the passing of the balls through the raceway.

In the present embodiment of my invention two raceways are shown arranged on diammetrically opposite sides of the shaft 2.

The driving element 4 may be actuated in any suitable manner as by a chain, driving shaft with gears etc., but it is here shown as actuated by a power transmitting mechanism forming the subject-matter of another application.

What I claim is:—

A differential mechanism comprising a driving element, a raceway carried by the driving element and including side portions extending on opposite sides of the driving element and end portions connecting the side portions, the side portions of the raceway being open at their outer lateral sides, balls movable in the raceway, and opposing wheels having sockets extending through the open sides of the raceway for receiving the balls, substantially as and for the purpose described.

In testimony whereof, I have hereunto signed my name, at Watertown, in the County of Jefferson, and State of New York, this 4 day of Jan., 1921.

FRANCIS H. ROOT.